Aug. 20, 1935. A. L. SAEKS 2,011,732
DEODORIZER
Filed Oct. 4, 1934
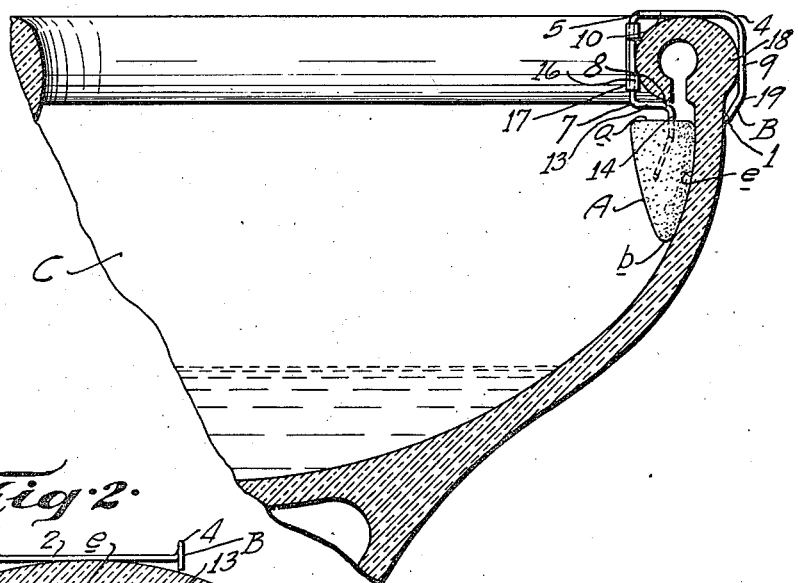
INVENTOR
Alvin L. Saeks.
ATTORNEY Patented Aug. 20, 1935

2,011,732

UNITED STATES PATENT OFFICE 2,011,732

DEODORIZER

Alvin L. Saeks, University City, Mo., assignor to The Puro Company, Inc., St. Louis, Mo., a corporation of Missouri Application October 4, 1934, Serial No. 746,800

3 Claims. (Cl. 4—231)

This invention relates generally to deodorizers. More particularly, my invention relates to a certain new and useful improvement in deodorizers especially adapted for use in connection with toilet-bowls and the like and has for its object the provision of a deodorizer for the purpose stated which may be cheaply and inexpensively manufactured, which is simple in form and structure, which may be conveniently suspended detachably upon and within the bowl, which is so constructed that, when suspended upon the bowl, the body or cake of deodorizing material is substantially visually concealed and protected from contamination by the bead of the bowl, and which is efficient in the performance of its intended functions.

And with the above and other objects in view, my invention resides in the novel features of form, construction, arrangement, and combination of parts presently described and pointed out in the claims.

In the accompanying drawing,—

Figure 1 fragmentally illustrates a toilet-bowl equipped with a deodorizer embodying my invention, the deodorizer being shown in side elevation;

Figure 2 is a transverse sectional view through the bowl and the hanger of the deodorizer, the body or cake of the deodorizer being shown in plan; and Figure 3 is an enlarged view also illustrating the deodorizer in installed position upon a toilet-bowl, the deodorizer being shown as it appears from the inside of the bowl and the body or cake of the deodorizer being broken away to disclose the supporting connection therewith of the hanger.

Referring now more in detail and by reference characters to the drawing, which illustrates a preferred embodiment of my invention, A designates what may be termed the body of the deodorizer, which is constructed of naphthalene, paradichlorbenzene, or other suitable material having deodorizing or so-called disinfecting properties and characteristics, and which is in the form of a cake having preferably, for purposes presently appearing, the semi-ellipsoidal shape and contour shown. More specifically, it may be said, the cake A has a slightly oblique or substantially flat upper surface $a$ and a rounded lower surface or margin $b$ whose ends meet the opposite ends $c$, $c$, of the upper surface $a$, the cake A having its greatest thickness, as at $d$, centrally of its upper margin or surface $a$ and tapering in thickness both toward the ends $c$, $c$, and its lower margin or surface $b$, and the cake A having a rear face $e$ of arcuate formation longitudinally from end to end of the cake.

B designates the hanger of the deodorizer, which is constructed preferably of a single section of suitable bendable or pliable wire, which, at spaced points within its length, as at 1, 1, is bent or doubled upon itself to provide substantially equal length strips integrally joined by a central portion or bite 2, each of said strips being then, at properly spaced intervals, as at 4, 5, 6, 7, and 8, bent to provide and include an upwardly presented portion or leg 9 a forwardly presented portion or leg-extension 10, an inwardly presented or offset portion 11, a first downwardly presented portion or upright 12, a rearwardly presented portion or arm 13, and a second downwardly presented portion or foot 14, said offset portions 11 being in opposed registering relation and the remaining portions of the one strip being approximately in parallel relation with like portions of the other strip, as shown.

In the formation or construction of the deodorizer, the naphthalene, paradichlorbenzene, or other material of which the cake A is composed is first in melted or liquid form disposed in a suitable mold having the configuration described. Such material is then permitted to solidify and harden, and during the hardening or solidifying period, the hanger B at its feet 14 is inserted into the hardening naphthalene, paradichlorbenzene, or other such material and becomes, upon the solidification thereof, firmly embedded therein and connected thereto, and to increase and augment the extent, rigidity, and firmness of the connection, the feet 14 are further bent and thereby provided with hook-ends 15. And to strengthen the hanger B and prevent spreading or collapsing of its legs or uprights 12, the latter are suitably engaged or clinched by bendable tongues 16 of a preferably metallic plate 17, which thus not only functions to re-enforce and strengthen the hanger B, but conveniently also provides a surface for the display of advertising matter or the like.

The cake A and hanger B being so united, the hanger B, and particularly the portions 2, 9, 10, 11, 12, and 13 thereof, provides, as it may be said, a spring hook for spanning and yieldingly engaging with the bead or enlarged upper margin 18 of a toilet-bowl or the like C, as shown, the plate-connected uprights 12 closely hugging or contacting the surface of the bead 18 and the inwardly presented arms 13 so disposing the cake A under the bead 18 that the same is thereby more or less concealed from vision and protected from contamination, the arcuate curvature of the cake rear face e and the general tapering form of the cake conforming substantially to the curvature, and enabling the cake to closely throughout hug the face, of the bowl.

As the cake A in use gradually evaporates, the hook-ends 15 of the hanger continue to function as supports until the cake A has through evaporation substantially entirely vanished, when the deodorizer, or what remains thereof, may be readily removed for replacement. Preferably, I may add, the hook-legs or shanks 9 are slightly obliquely bent, as at 19, for augmenting the springwise engagement of the hanger B with the bead 18, as best seen in Figure 1.

The deodorizer fully achieves the objects stated, and it is to be understood that changes in the form, construction, arrangement, and combination of the several parts thereof may be made and substituted for those herein shown and described without departing from the nature and principle of my invention.

Having thus described my invention, what I claim and desire to secure by Letters Patent is,—

1. In a toilet-bowl deodorizer, a cake of deodorizing material having an approximately flat upper face and a rounded lower margin whose ends meet the opposite ends of the upper face, the cake having its greatest thickness centrally of its upper face and tapering in thickness both towards the opposite ends of its said face and its said lower margin, and the cake having a rear face of arcuate formation longitudinally from end to end of the cake, substantially as and for the purpose described, and means for supporting the cake within a toilet-bowl.

2. In a toilet-bowl deodorizer, a cake of deodorizing material and a hanger, the latter being constructed of a bendable material-section having its opposite ends embedded in the cake and intermediate its said ends being bent upon itself and providing approximately equal length strips and a central portion uniting the strips in spaced relation, each strip including a leg projecting approximately at right-angles from an end of the central portion, an extension projecting angularly and forwardly from the leg, an off-set portion projecting inwardly from the extension, and an upright projecting downwardly from the off-set portion, the off-sets of the strips being in opposed relation and the leg, extension, and upright of one strip being approximately in parallel relation with like members of the other strip, and the recited members of said strips co-operably forming a spring-hook for spanning and yieldingly engaging the bead of a toilet-bowl for suspending the cake therein, each strip also including an arm presented rearwardly from the upright, and a foot presented downwardly from the arm for disposing the suspended cake in substantially concealed position under said bead, the cake being of tapered arcuate formation for snugly hugging the adjacent surface of the bowl.

3. In a toilet-bowl deodorizer, a cake of deodorizing material, a hanger constructed of a bendable material-section having its opposite ends embedded in the cake and intermediate its said ends being bent upon itself and providing approximately equal length strips and a central portion uniting the strips in spaced relation, each strip including a leg projecting approximately at right-angles from an end of the central portion, an extension projecting angularly and forwardly from the leg, an off-set portion projecting inwardly from the extension, and an upright projecting downwardly from the off-set portion, the off-sets of the strips being in opposed relation and the leg, extension, and upright of one strip being approximately in parallel relation with like members of the other strip, and the recited members of said strips co-operably forming a spring-hook for spanning and yieldingly engaging the bead of a toilet-bowl for suspending the cake therein, each strip also including an arm presented rearwardly from the upright, and a foot presented downwardly from the arm for disposing the suspended cake in substantially concealed position under said bead, the cake being of tapered arcuate formation for snugly hugging the adjacent surface of the bowl, and a plate marginally engaged by said uprights for re-enforcing the hook-structure of the bracket and for flatwise overlying an exposed surface of the bead.

ALVIN L. SAEKS.